(12) United States Patent
Nakanishi

(10) Patent No.: US 6,232,743 B1
(45) Date of Patent: *May 15, 2001

(54) ELECTRIC VEHICLE

(75) Inventor: Toshiaki Nakanishi, Toyohashi (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,790

(22) Filed: Sep. 8, 1998

(30) Foreign Application Priority Data

Sep. 9, 1997 (JP) .................................... 9-243829

(51) Int. Cl.$^7$ ...................................... H02J 7/00
(52) U.S. Cl. ............................ 320/104; 320/103
(58) Field of Search ................... 320/104, 103, 320/112, 113; 180/65

(56) References Cited

U.S. PATENT DOCUMENTS

| 4,313,080 | 1/1982 | Park ..................................... 320/123 |
| 5,623,194 | 4/1997 | Boll et al. ............................. 320/137 |
| 5,627,438 | * 5/1997 | Barrett ................................. 318/139 |
| 5,647,450 | * 7/1997 | Ogawa et al. ........................ 180/220 |
| 5,717,310 | * 2/1998 | Sakai et al. ........................... 320/104 |
| 5,808,448 | 9/1998 | Naito ..................................... 320/101 |

FOREIGN PATENT DOCUMENTS

| 39 07 697 C1 | 3/1989 | (DE) . |
| 44 22 005 A1 | 6/1994 | (DE) . |
| 2 253 379 | 9/1992 | (GB) . |
| 0 739 048 A1 | 11/1995 | (JP) ..................................... 320/134 |
| 08-163711 | 6/1996 | (JP) . |
| WO 93/02887 | 2/1993 | (WO) .................................... 363/21 |
| WO 96/22625 | 1/1996 | (WO) .................................. 320/134 |

\* cited by examiner

*Primary Examiner*—Peter S. Wong
*Assistant Examiner*—Lawrence Luk
(74) *Attorney, Agent, or Firm*—Akin, Gump, Strauss, Hauer & Feld, L.L.P.

(57) ABSTRACT

The present invention provides an electric vehicle, which enables the installed battery to be replaced with many kinds of batteries and having high reliability and economical properties. The electric vehicle comprises: a driving unit for driving the electric vehicle with an electricity; a vehicle controller for controlling the driving unit; a battery unit for supplying an electric power to the driving unit; and a battery charger for charging the battery unit, the battery unit being provided with plural secondary batteries and means for monitoring the state of the secondary batteries thereby to issue a signal to the vehicle controller based on the obtained information from the secondary batteries.

7 Claims, 3 Drawing Sheets

ELECTRIC VEHICLE

BACKGROUND OF THE INVENTION

The present invention relates to an electric vehicle driven by a secondary battery, more particularly to a charge/discharge control of the secondary battery for the electric vehicle.

Performance and reliability of secondary batteries such as lead acid storage batteries, nickel-metal hydride storage batteries and lithium secondary batteries have been improved in these days. Consequently, there have been also developed many devices driven by the secondary batteries. Especially, in recent years, clean energies are aimed widely and electric vehicles such as electromobiles, motor scooters, forklifts which are driven by the secondary batteries are attracting a great deal of attention.

In such an electric vehicle, a vehicle controller mounted in an object vehicle controls the output of the motor, and also monitors and controls the batteries. Monitoring a remaining capacity, an output voltage, and a cooling state, or the like of the batteries installed in the vehicle, the vehicle controller decides the battery state including the level of degradation thereby to control the output of the motor and charging of the battery based on the obtained battery information. In addition, the vehicle controller issued warnings to the driver if necessary.

In the case of a conventional electric vehicle, the battery is considered to be a mere driving power source. The vehicle controller is thus fixed to a vehicle. Therefore, when the battery is degraded or down, the battery is just replaced. Consequently, each time the battery is replaced with a different specification, the vehicle controller set values must be changed so as to correspond with the new battery.

BRIEF SUMMARY OF THE INVENTION

The object of the present invention is to solve above-mentioned problems and to provide a low price electric vehicle which is highly compatible with many types of batteries and accordingly highly reliable.

The present invention provides an electric vehicle of the present invention comprises: a driving unit for driving the electric vehicle with an electric power; a vehicle controller for controlling the driving unit; a battery unit for supplying an electric power to the driving unit; and a battery charger for charging the battery unit. The battery unit includes plural secondary batteries and means for monitoring states of the plural secondary batteries and for issuing a signal to the vehicle controller based on the obtained information. The vehicle controller controls the driving unit and the battery charger based on the signal from the battery unit.

The states of the batteries have been monitored by the vehicle controller fixed to the vehicle in the conventional electric vehicle. On the contrary, according to the present invention, the batteries and means for monitoring the batteries are disposed in one unit in the electric vehicle. In other words, information on the batteries is obtained in the very unit in which the batteries are installed and the unit issues control commands to the vehicle controller provided outside the unit. On the basis of such control commands, the vehicle controller controls the driving unit and the battery charger.

Generally, a service life of a battery is shorter than that of a chassis of an electric vehicle. Consequently, the battery must be replaced due to the end of life in many cases while the chassis is still in use. Therefore, when a mileage of the electric vehicle reaches a certain value or when the battery usage period reaches a certain value, the battery is replaced. Further, it is also considered that the battery is replaced with a higher performance one in order to improve the performance of the vehicle. Such battery replacement is made as a whole battery unit replacement.

If commands issued from such a battery unit to the vehicle controller are standardized and the monitoring means is set appropriately to the battery specifications, it is possible to omit troublesome changes of set values for controlling the vehicle even when a new battery with a different specification is employed. It is also possible to control the output of the battery more effectively, so that performance of the battery can be shown fully, assuring a high reliability for the electric vehicle.

An electric vehicle is already provided with a predetermined space for installing a battery unit. Therefore, an increased number of batteries can be installed instead of the originally installed battery if the new battery is more compact in size than the original battery and the new battery unit can be accommodated in the predetermined space. Consequently, the electric vehicle of the present invention will be advantageous in space utility. In addition, the vehicle can cope with improvement in battery performance easily.

In a preferred mode of the present invention, the battery unit is composed as one unit detachable from the electric vehicle. For example, if all elements composing the battery unit are housed in a box-like case detachable from the vehicle, the maintainability for battery replacement will be improved significantly.

In another preferred mode of the present invention, the monitoring means detects output voltage or temperature of the secondary battery.

It is preferable that the battery unit is provided with means for cooling the batteries. The cooling means such as a set of an air-cooling sutructure and a cooling fan, or a set of a water-cooling structure and a water pump is provided independently of the vehicle or the vehicle controller. More preferably, the cooling means functions based on the temperature of the secondary battery detected by the monitoring means. When the temperature of the secondary battery rises due to a long running of the vehicle, the cooling means cools down the batteries in each unit appropriately to the characteristics of those batteries.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Hereafter, a preferred embodiment of the present invention will be described in detail with reference to the attached drawings.

Figure 1:
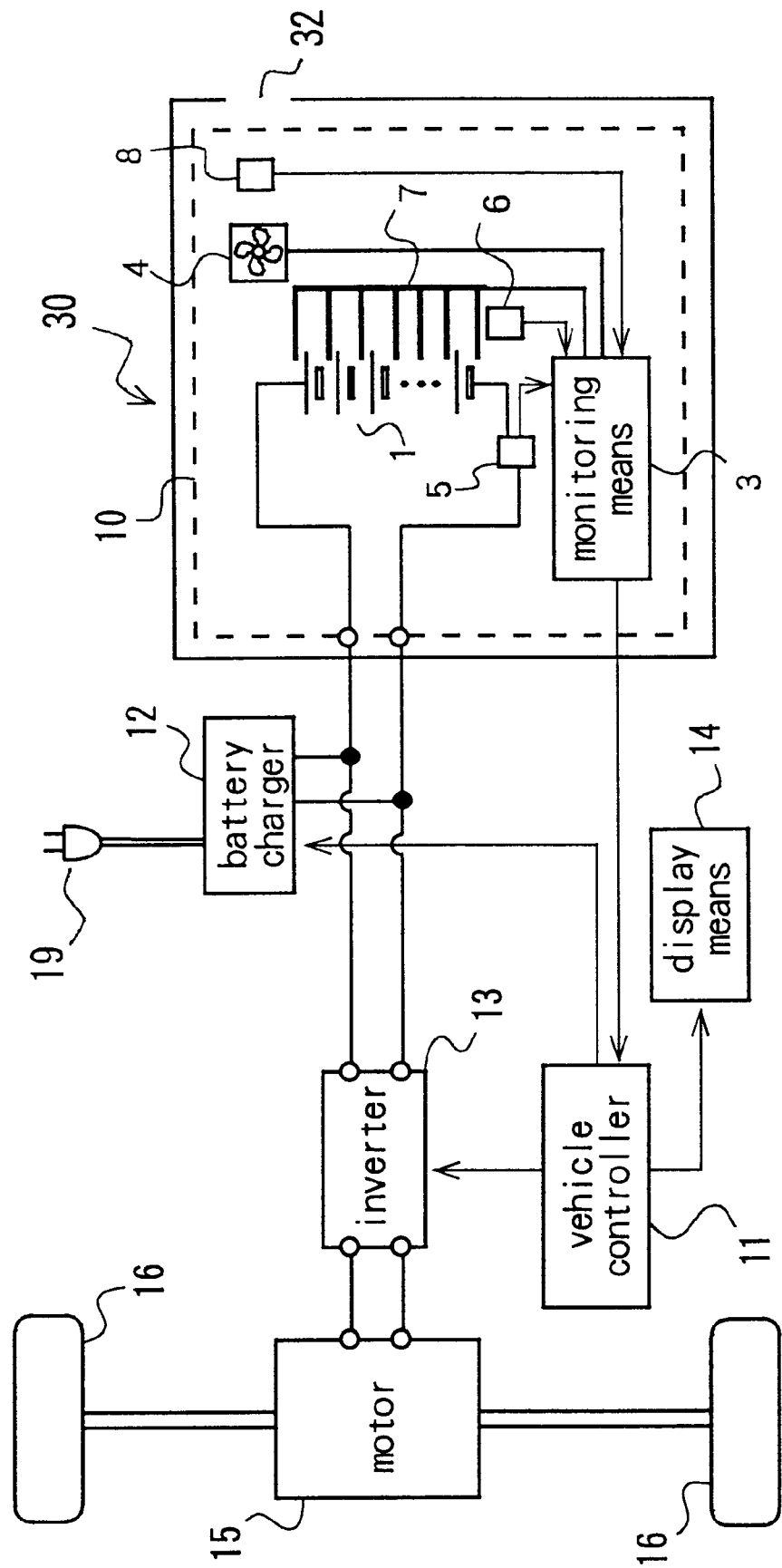
FIG. 1 is a schematic view showing a configuration of an electric vehicle in an embodiment of the present invention.

FIG. 1 shows a configuration of the electric vehicle of the present invention. In this electric vehicle, an output current of a battery unit 10 rotates a motor 15, thereby drives wheels 16. The output DC current from the battery unit 10 is converted by an inverter 13 to an pulse current, then supplied to the motor 15. Then the DC current is supplied to the battery unit 10.

During vehicle braking, a kinetic energy of a vehicle transformed to an electric energy by making the motor 15 and the inverter 13 as an generators. Then, the generated DC current is supplied to the battery unit 10.

Figure 2:
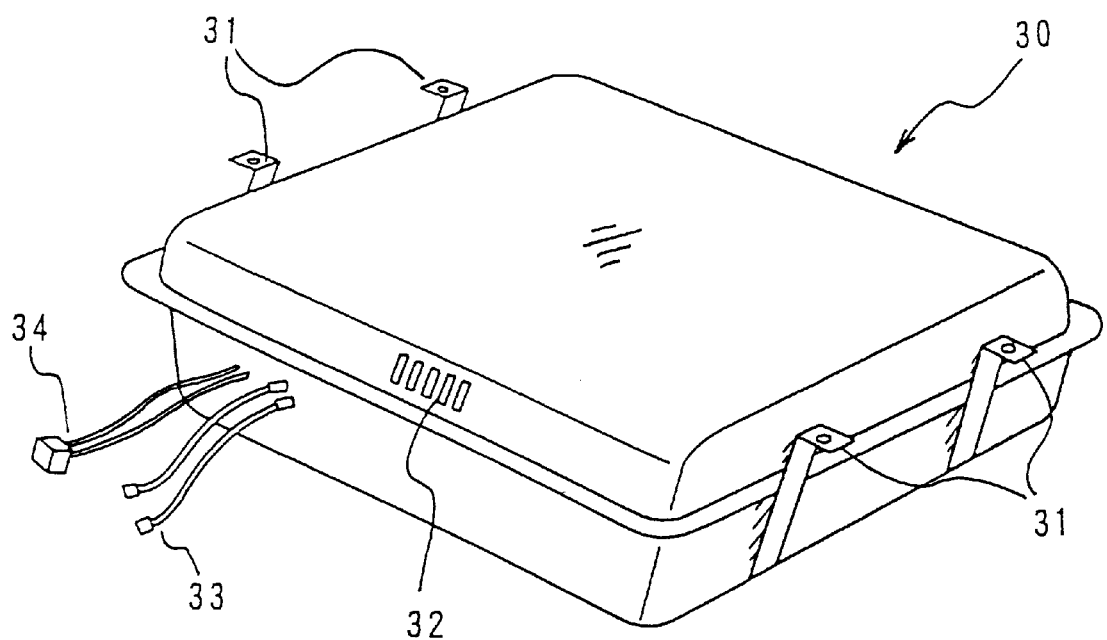
FIG. 2 is a perspective view showing an external appearance of a battery unit of the electric vehicle.

The battery unit 10 is composed as one unit detachable from the electric vehicle. The battery unit 10 is housed in a box-shaped case 30 as shown in FIG. 2. The attachment members 31 are fastened by a belt (not shown) so as to attach the battery unit 10 inside the box-shaped case 30 to the electric vehicle. A power input/output harnesses 33 is used to connect a battery group 1 in the battery unit 10 to a battery charger 12 and the inverter 13. A monitoring means signal harness 34 is used to connect monitoring means 3 in the battery unit 10 to a vehicle controller 11. A cooling air inlet 32 takes a cooling air inside the box-shaped case 30 or the battery unit 10.

The battery group 1, which is an output source of the battery unit 10, is composed of plural secondary batteries serially connected to each other. The secondary batteries are, for example, nickel-metal hydride storage batteries.

A fan 4 cools down the battery unit 1 to suppress a raise in temperature of the battery unit 1. A current sensor 5 senses the output current of the battery group 1 and issues a signal corresponding to the sensed current quantity to a monitoring means 3. A temperature sensor 6 senses a temperature of the battery group 1 and issues a corresponding signal to the monitoring means 3. A suction air temperature sensor 8 provided closely to the cooling air inlet 32 senses a temperature of the air sucked into the battery unit 10 and issues a corresponding signal to the monitoring means 3. In this embodiment, each of the temperature sensor 6 and the suction air temperature sensor 8 may be a thermistor or a thermoelectric couple, for example.

The output of the battery unit 10 is supplied to the motor 15 via the inverter 13. At charging, an external power source (not shown) is connected to a connector 19 and a current from the external power source is supplied to the battery unit 10 via a battery charger 12.

Figure 3:
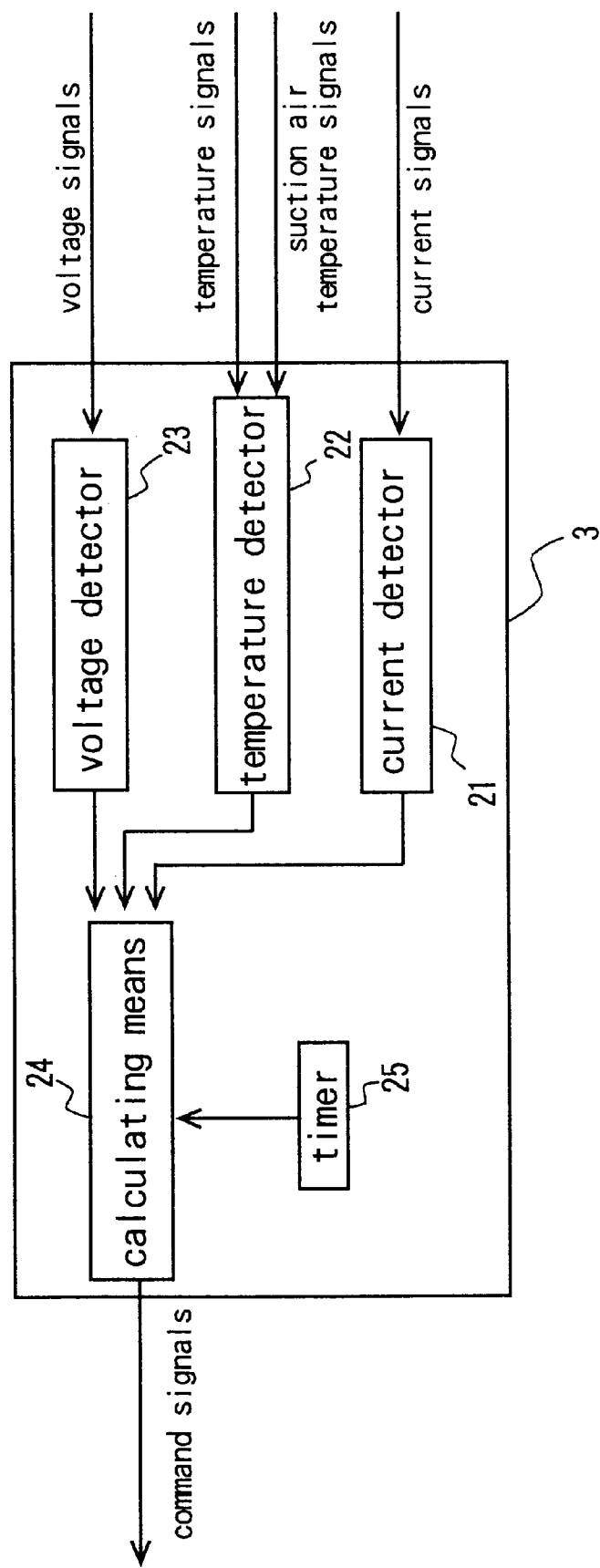
FIG. 3 is a schematic view showing a configuration of the battery unit.

The monitoring means 3, as shown in FIG. 3, is provided with a current detector 21, a temperature detector 22, and a voltage detector 23, each of which being used to detect entered signals. The current detector 21 detects the current output of the battery group 1 based on the signal from the current sensor 5. The temperature detector 22 detects the temperature of the battery group 1 based on the signal from the temperature sensor 6, as well as the temperature of sucked air based on the signal from the suction air temperature sensor 8. The voltage detector 23 detects the total voltage of the battery group 1 or the voltage of a block composed of plural batteries from the signal obtained via a harness 7 connected to the battery group 1.

The information items concerning the battery unit 10 are outputted to calculating means 24. The calculating means 24 analyzes those information items under the control of a program stored beforehand and issues command signals to the vehicle controller 11. A timer 25 makes the calculating means 24 output the result of calculation to the vehicle controller 11 at predetermined intervals.

Furthermore, the calculating means 24 controls a rotation of the fan 4. The calculating means 24 accelerates the rotation of the fan 4 to increase the cooling efficiency of the battery group 1 if a temperature of the battery group 1 becomes higher than a predetermined value or if the difference between the temperature of the battery group 1 and the temperature of the suction air exceeds a predetermined value due to long running of the vehicle.

Such monitoring means 3 may be composed of one device easily by utilizing the conventional technique.

The vehicle controller 11 controls the battery charger 12 and the inverter 13 based on the command signal from the monitoring means 3.

The battery charger 12 controls charging of the battery group 1 based on the control signal from the vehicle controller 11.

The inverter 13 controls the current quantity to be supplied to the motor 15 from the battery unit 10 based on the control signal from the vehicle controller 11. The monitoring means 3 instructs the vehicle controller 11 to force the inverter 13 to reduce the power supply to the motor 15 or to force it to stop the power supply for a predetermined time when detecting an abnormality such as abrupt heat generation in the battery group 1. For example, the monitoring means 3 analyzes whether a fault is detected in the battery unit 10, how far the batteries are degraded, and such information as internal resistance value. Then, the monitoring means 3 tries to stop the degradation of the batteries and instructs the vehicle controller 11 to reduce the output of the motor 15 so as to extend the traveling distance of the vehicle.

The vehicle controller 11 displays such battery information obtained from the battery unit 10 on displaying means 14.

The displaying means 14 displays the information concerning the battery group 1, for example, fault information of each component in the battery unit 10, the necessity of replacement of the battery unit 10, a proper replacement timing thereof, and information on the battery group 1 such as a preferred charging timing, the residual capacity, the internal resistance, and the degradation level. The displaying means 14 can also notify the driver of countermeasures for a fault or an estimated service life of the battery unit 10, as well as a proper replacement timing of the battery unit 10. Preferably, the displaying means 14 should display every necessary information to keep the safety and the reliability of the battery group 1 including warning messages issued to the driver. The displaying means 14 may be LED lamps and a liquid crystal display unit, for example.

As described above, it is possible to provide an electric vehicle with high reliability, according to the present invention. In addition, since the electric vehicle enables the power source to be developed independently of the vehicle body, the developing term can be shortened more than the developing of the whole vehicle including battery specifications. Consequently, the comprehensive developing cost can be reduced significantly.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

I claim:

1. An electric vehicle comprising:
   a driving unit for driving said electric vehicle with an electric power;

a vehicle controller for controlling said driving unit;

a battery unit for supplying an electric power to said driving unit; and a battery charger for charging said battery unit, wherein said battery unit includes plural secondary batteries and means for monitoring the state of said secondary batteries and for issuing a signal based on the obtained information to said vehicle controller, and said vehicle controller controls said driving unit and said battery charger based on said signal from said battery unit.

2. The electric vehicle in accordance with claim 1, wherein said battery unit is composed as one unit detachable from said electric vehicle.

3. The electric vehicle in accordance with claim 1, wherein said monitoring means detects output voltage of each of said secondary batteries.

4. The electric vehicle in accordance with claim 1, wherein said monitoring means detects a temperature throughout said secondary batteries.

5. The electric vehicle in accordance with claim 1, wherein said battery unit includes means for cooling said secondary batteries.

6. The electric vehicle in accordance with claim 5, wherein said cooling means operates in response to said temperature throughout said secondary batteries detected by said monitoring means.

7. The electric vehicle in accordance with claim 1, wherein said battery unit includes a displaying means for displaying the obtained information.

* * * * *